United States Patent [19]

Smotherman

[11] Patent Number: 5,330,010
[45] Date of Patent: * Jul. 19, 1994

[54] WEED EXTRACTION APPARATUS

[76] Inventor: Robert J. Smotherman, 5430 Burkett La., Loomis, Calif. 95630

[*] Notice: The portion of the term of this patent subsequent to Nov. 16, 2010 has been disclaimed.

[21] Appl. No.: 147,494

[22] Filed: Nov. 4, 1993

Related U.S. Application Data

[63] Continuation-in-part of Ser. No. 939,018, Sep. 2, 1992, Pat. No. 5,261,496.

[51] Int. Cl.⁵ .................... A01B 33/06; A01D 9/06
[52] U.S. Cl. ................................ 172/25; 294/50; 172/378
[58] Field of Search ............... 172/23, 25, 27, 28, 172/21, 22, 371, 372, 378, 523; 171/21, 22; 294/50, 50.5, 61

[56] References Cited

U.S. PATENT DOCUMENTS

| | | |
|---|---|---|
| D. 322,918 | 1/1990 | Parks . |
| 1,549,198 | 8/1925 | Haney . |
| 2,250,313 | 7/1941 | Petz et al. . |
| 2,402,550 | 6/1946 | Hiack . |
| 2,593,283 | 4/1952 | Erlebach . |
| 2,680,643 | 6/1954 | Cravotta . |
| 2,804,336 | 8/1957 | Thompson . |
| 2,855,668 | 10/1958 | Ottenad et al. . |
| 2,862,755 | 12/1958 | Gulden . |
| 3,333,881 | 8/1901 | Hollinger . |
| 3,596,966 | 8/1967 | Shredl . |
| 3,633,958 | 1/1972 | Mesrobian . |
| 3,663,050 | 5/1972 | Fuchs . |
| 3,830,310 | 8/1974 | Williams . |
| 4,603,744 | 8/1986 | Ramirez . |
| 4,641,712 | 2/1987 | Cravotta . |
| 4,723,802 | 2/1988 | Fambrough . |
| 4,819,736 | 4/1989 | Hedgepeth . |
| 5,004,283 | 4/1991 | Sullivan . |
| 5,005,888 | 4/1991 | Parks et al. . |

FOREIGN PATENT DOCUMENTS 211366 11/1955 Australia .

Primary Examiner—Randolph A. Reese
Assistant Examiner—Spencer Warwick
Attorney, Agent, or Firm—John P. O'Banion

[57] ABSTRACT

An apparatus (10) for rotary extraction of weeds and other vegetation by hand or by using a power driver. The apparatus includes a hollow guide tube (20) in which a shaft (16) is slidably disposed. An extraction head having a plurality of pointed rods (12) or prongs (62) is coupled to shaft (16), and can be extended or retracted by movement of shaft (16) within the guide tube (20). The rods (12) or prongs (62) are extended and inserted into the soil over the vegetation to be removed. Rotation of the apparatus winds the vegetation and its root around the rods (12) or prongs (62) and removes it from the soil. The vegetation is then ejected from the apparatus by retracting the rods (12) or prongs (62) and, if necessary, sliding the vegetation off of the tapered sleeve (30).

17 Claims, 6 Drawing Sheets

FIG.—1

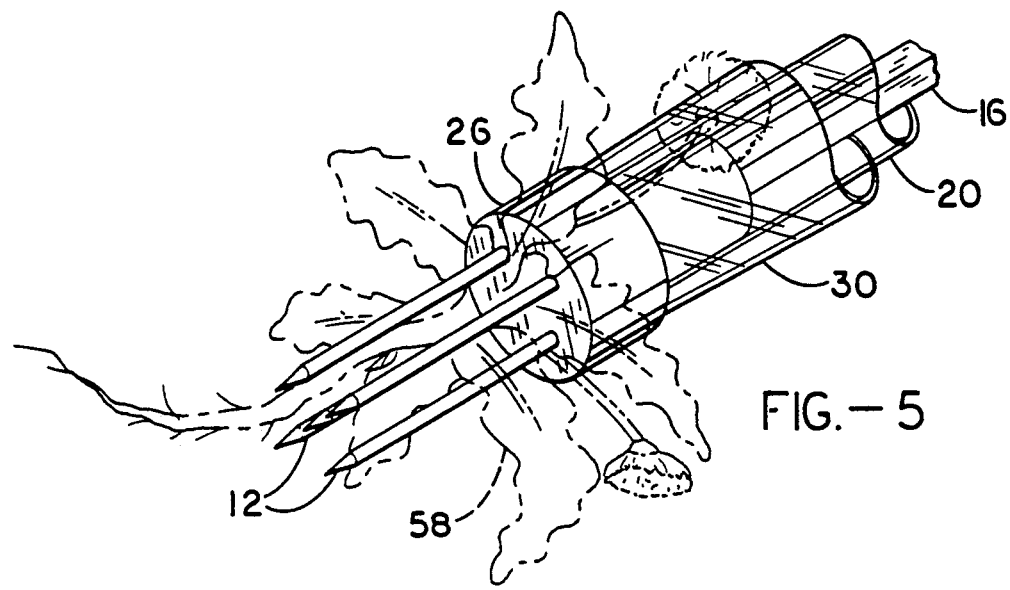
FIG.—5
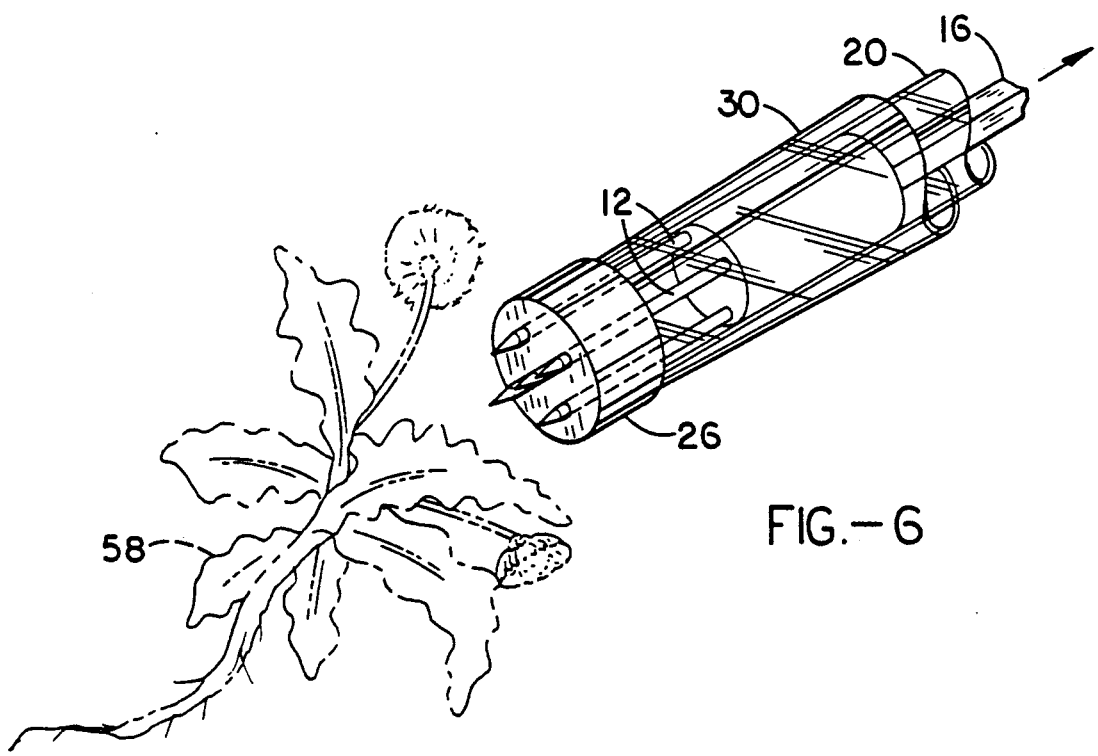
FIG.—6

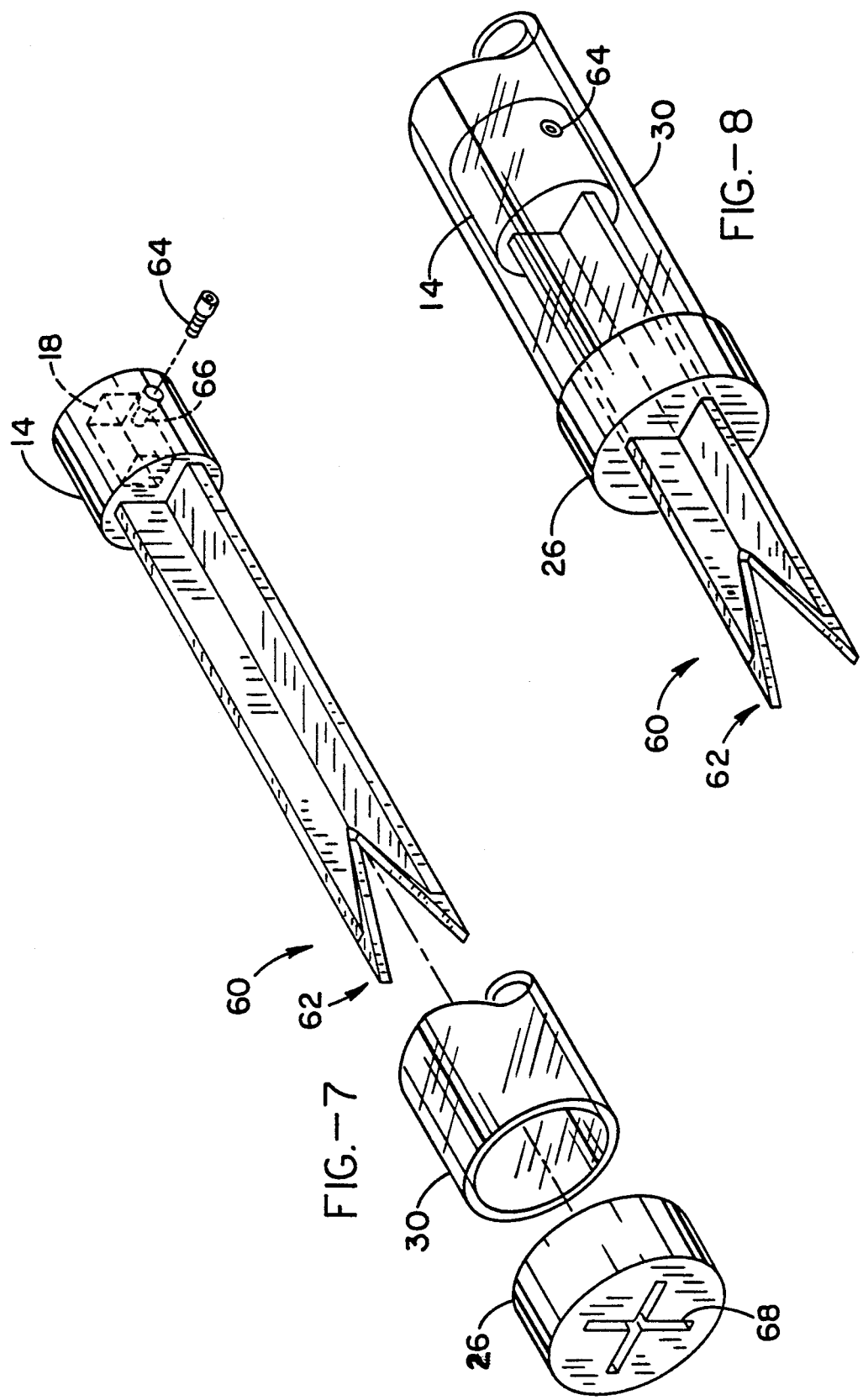

WEED EXTRACTION APPARATUS

CROSS REFERENCE TO RELATED APPLICATIONS

This is a continuation-in-part of Ser. No. 07/939,018 filed on Sep. 2, 1992, now U.S. Pat. No. 5,261,496.

BACKGROUND OF THE INVENTION

1. Field of the Invention

This invention pertains generally to weed extraction devices, and more particularly to a device for rotary removal of weeds without entanglement.

2. Description of the Background Art

Weed removal from plant beds, lawns, and other vegetated areas can be a tedious task. To ease the removal of weeds, a number of devices have been developed which include forks, tines or cutters which can be forced into the soil surrounding the weed and operated to either extract or cut the weed. When weeds are cut, however, the root system remains and the weed will grow back over a period of time. Therefore, rotary extraction is preferred since the root can be removed intact.

Rotary extraction devices heretofore developed suffer from various disadvantages, most notably that the extracted weed becomes entangled in the device and ejection of the weed from the extraction head is difficult. As a result, the user must unwrap or cut the weed in order to remove it from the device. Therefore, a need exists for a rotary weed extraction tool which can effectively remove the weed and its roots, while at the same time providing for ease of ejection of the weed and minimizing entanglement.

SUMMARY OF THE INVENTION

The present invention overcomes the deficiencies in existing rotary weed extraction devices by employing a configuration and structure which provides for ease of weed ejectment and minimal entanglement of the weed with the device.

By way of example and not of limitation, the present invention generally comprises an elongated cylindrical housing of either uniform diameter or, preferably, having a taper toward the weed extraction end. The weed extraction end of the housing is covered with a cap having a plurality of openings therein. A weed extraction head having several long, pointed rods, which extend through the openings in the cap is coupled to one end of a shaft which slides within the housing. The number of rods used can vary depending upon the type of weed to be extracted.

In an alternative embodiment of the invention, the weed extraction head includes a plurality of tapered prongs separated by a V-shaped notch. In this embodiment, the extraction head would have two, four, or six prongs depending upon the type of weed to be extracted. In operation, the prongs are positioned so that the root of the weed will fit within the V-shaped notch and are subsequently pushed into the soil, and the ratchet is turned as before. Because the V-shaped notch will automatically accommodate different sizes of roots, positive engagement of the root will occur regardless of the size of the weed.

By sliding the shaft in and out of the housing, the rods or prongs can be withdrawn into the housing or extended outward. The other end of the shaft includes a receptacle for coupling to a standard manual wrench ratchet handle, motorized ratchet handle, electric drill, power-take-off of a tractor, or the like.

In hand operation, the rods or prongs are placed over the root of the weed at ground level and pushed into the soil, and the ratchet is turned to impart a twisting motion to the extraction head. The extraction head engages the root of the weed, and effectively twists the root and weed out of the soil. Removal of the root with the twisting motion is a distinct advantage over other tools because no digging is required and a minimal amount of dirt is removed. Motorized operation is substantially the same.

For large weeds or vines, the vegetation might wrap around the extraction head and housing when the ratchet is turned. By sliding the shaft out of the housing, the extraction head will retract and the weed will easily slide off. Similarly, because the housing is tapered, only slight effort is required to slide the vegetation off of the housing.

An object of the invention is to provide for rotary extraction of weeds.

Another object of the invention is to extract weeds with minimal removal of soil.

Another object of the invention is to remove a weed and its root system.

Another object of the invention is to provide for easy ejection of a removed weed.

Another object of the invention is to minimize entanglement of a weed during removal.

Another object of the invention is to provide interchangeable extraction heads to accommodate various types of weeds.

Another object of the invention is to provide an extraction head that accommodates various sizes of roots.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 5 is a diagrammatic view of the lower end of the apparatus of FIG. 1 extracting a weed shown in phantom.

FIG. 6 is a diagrammatic view of the lower end of the apparatus of FIG. 1 ejecting an extracted weed shown in phantom.

FIG. 7 is an exploded view of a portion of the apparatus shown in FIG. 1 employing an extraction head having four prongs separated by a V-shaped notch.

FIG. 8 is an assembled view of portion of the apparatus shown in FIG. 7.

DESCRIPTION OF THE PREFERRED EMBODIMENTS

Figure 1:
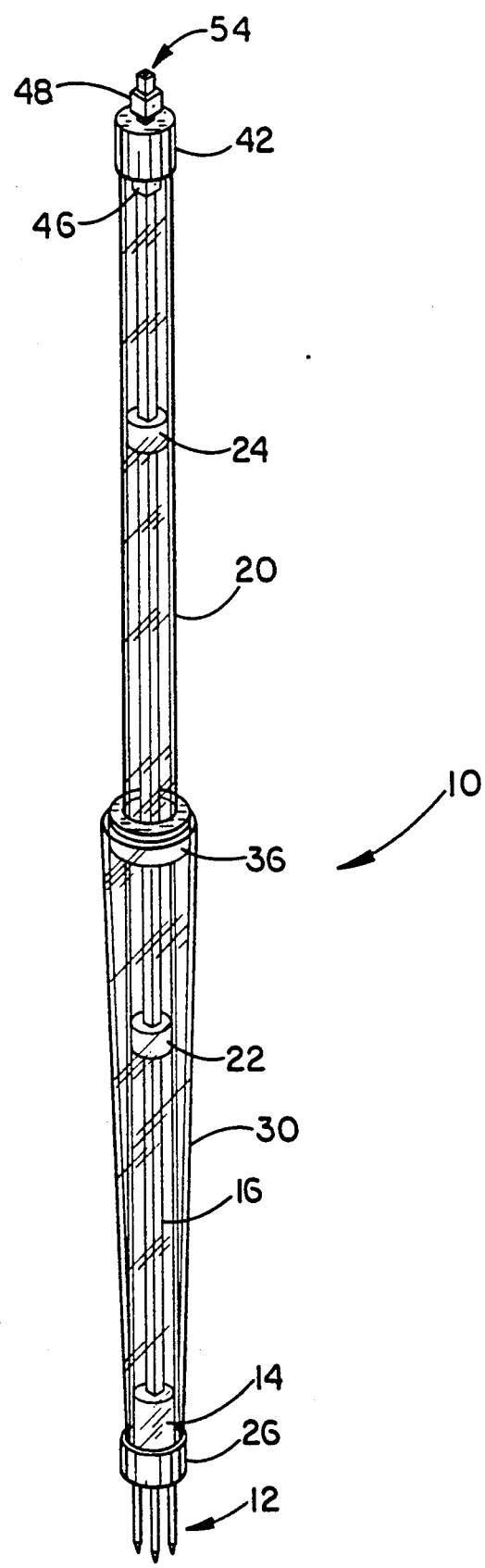
FIG. 1 is a perspective view of the apparatus of the present invention.
Figure 2:
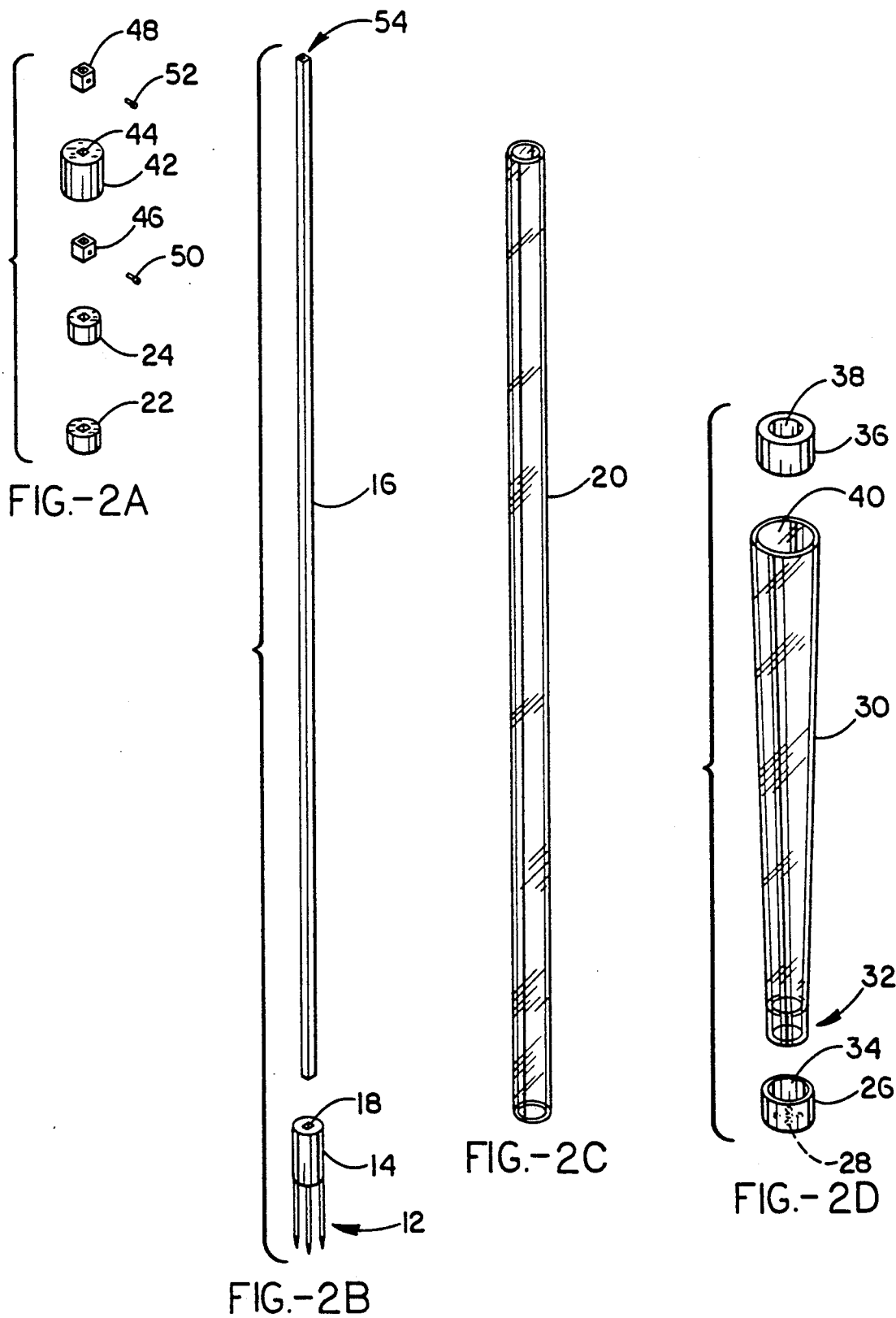
FIG. 2A through 2D present an exploded view of the apparatus of FIG. 1.

Referring more specifically to the drawings, for illustrative purposes the present invention is embodied in the apparatus generally shown in FIG. 1, FIG. 2A through FIG. 2D, and FIG. 7 through FIG. 11. It will be appreciated that the apparatus may vary as to configuration and as to details of the parts without departing from the basic concepts as disclosed herein.

Referring to FIG. 1 and FIG. 2A through 2D, the present invention provides a weed extraction device 10 which includes a plurality of spaced-apart rods 12 for insertion into the soil and the area surrounding root of a weed or other vegetation to be removed. Rods 12 are preferably slender, cylindrical, rigid, and elongated rods with sharp points at their proximal ends. The distal ends of rods 12 are attached to a cylindrical-shaped coupling 14 to form a weed extraction head. For removal of vegetation in lawn areas, it is preferred that one rod be placed in the center of the coupling with four rods radially disposed around the center rod. For removal of vegetation in areas with rocks, it is preferred that the rods be positioned in a straight line for a fork-like configuration. Those skilled in the art will appreciate that other placement patterns can be employed.

A shaft 16 is attached to coupling 14 by insertion into an opening 18 which is coaxially positioned in coupling 14 and which frictionally engages shaft 16. Alternatively, shaft 16 could be welded, glued, integrally joined to, or otherwise attached to coupling 14. In order to make the extraction head replaceable or interchangeable with other extraction heads, shaft 18 could be alternatively be coupled to coupling 14 by means of a set screw or the like extending through coupling 14 and into opening 18 to engage shaft 16. Shaft 16 is coaxially positioned within a hollow guide tube 20. Guide tube 20 has an inner diameter approximately equalling the outer diameter of coupling 14. Bushings 22, 24 which have diameters equalling that of coupling 14 are threaded onto shaft 16 to serve as spacers between shaft 16 and guide tube 20. In this manner, shaft 16 will slide within guide tube 20.

Covering the proximal end of guide tube 20 is a cap 26 having a plurality of holes 28 through which rods 12 extend. Cap 26 serves to guide and stabilize rods 12, as well as to prevent the travel of coupling 14 beyond the proximal end of guide tube 20.

While shown as having a square shape, shaft 16 could be cylindrical, rectangular, flattened or the like without departing from the concepts disclosed herein. Similarly, while guide tube 20 and bushings 22, 24 are shown as being cylindrically-shaped, they could be square, rectangular, or flattened or the like.

Although the apparatus will function adequately with shaft 16 sliding within guide tube 20 as described above, in the preferred embodiment guide tube 20 is coaxially positioned within a conically-shaped hollow sleeve 30. The proximal ends of guide tube 20 and sleeve 30 are aligned to terminate at substantially the same point, and cap 26 covers the proximal end of sleeve 30 as well as the proximal end of guide tube 20. Sleeve 30 tapers from its distal end toward its proximal until it reaches a point at which the diameter of sleeve 30 becomes substantially uniform to form a tip 32 which mates with receptacle 34 in cap 26.

Located at the distal end of sleeve 30 is a plug 36 through which a hole 38 coaxially extends. Plug 36 is threaded over guide tube 20 and inserted into a receptacle 40 located in the distal end of sleeve 30. By fabricating plug 36 from a resilient material such as rubber or the like, plug 36 can be press fitted into receptacle 40 which will cause plug 36 to compress and frictional engage guide sleeve 20 to hold it in position. Alternatively, plug 36 could be welded, glued or otherwise attached to sleeve 30 and guide tube 20 to join them in a fixed position.

Figure 3:
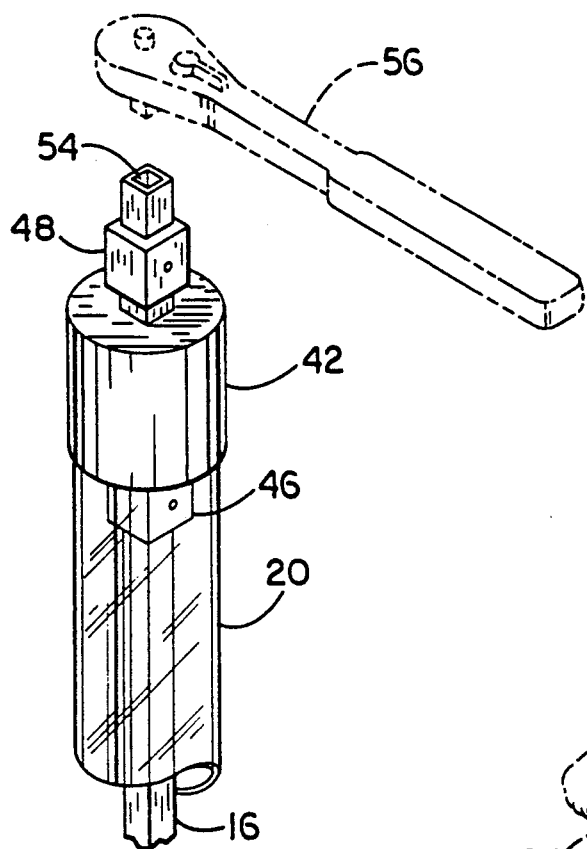
FIG. 3 shows the upper portion of the apparatus of FIG. 1 in context of attachment to a ratchet shown in phantom.

Positioned over the distal end of guide tube 20 is a cap 42 having a coaxially disposed hole 44 through which shaft 16 extends. Positioned over shaft 16 on each side of cap 42 are collars 46, 48 which are fixed in place by set screws 50, 52, respectively, or other means of attachment. When shaft 16 slides out of guide tube 20, collar 46 will limit its travel by engaging the inner surface of cap 42. Collar 46 is therefore adjusted to limit the amount of retraction of rods 12 relative to the proximal end of guide sleeve 20. When shaft 16 slides into guide tube 20, collar 48 will limit its travel by engaging the outer surface of cap 42. Collar 48 is therefore adjusted to limit the amount of extension of rods 12 relative to the proximal end of guide sleeve 20. Referring also to FIG. 3, a receptacle 54 is placed in the distal end of shaft 16 so that shaft 16 is configured and structured for coupling to a standard manual ratchet wrench handle 56. Alternatively, shaft 16 could be adapted for coupling to an electric drill, a motorized ratchet handle, the power-take-off of a tractor, or the like.

The components described herein can be fabricated from lightweight, rigid materials such as high impact plastic, aluminum, stainless steel, or the like. Preferably, rods 12, coupling 14, and cap 22 are fabricated from corrosion resistant materials since they will be exposed to water and soil acids.

Figure 4:
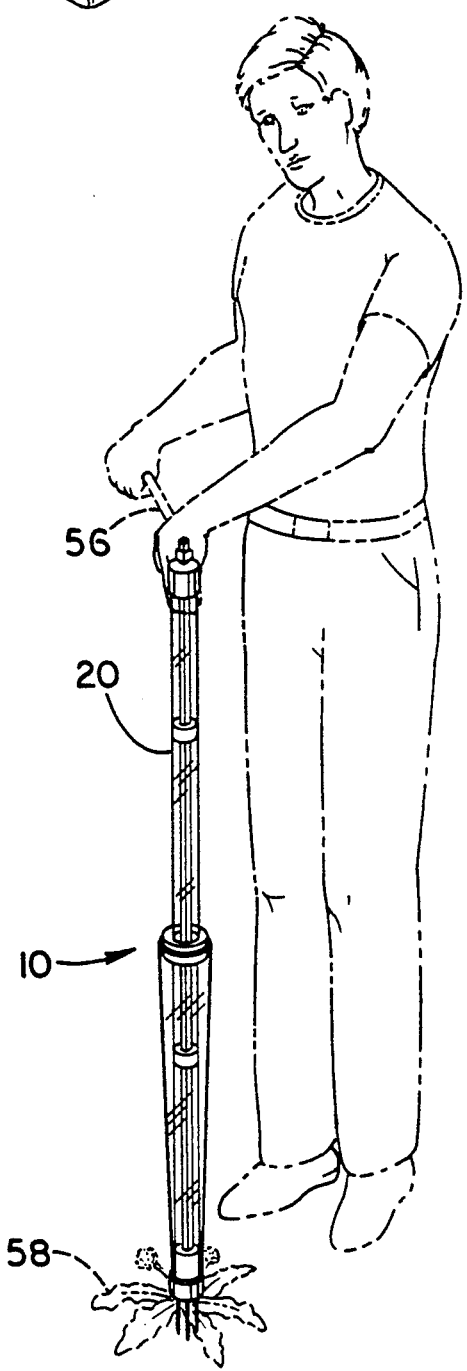
FIG. 4 is a diagrammatic view of the apparatus of FIG. 1 positioned for extraction of a weed shown in phantom.

Referring now to FIG. 4 and FIG. 5, in a typical application the user positions the apparatus over the central portion of a weed 58 and extends rods 12 into the weed and surrounding soil. Guide tube 20 is then grasped with one hand and ratchet 56 rotated with the other hand. Rotation is continued until the weed and, most importantly, its root wraps around rods 12 and is removed from the soil. Referring also to FIG. 6, to eject the weed from the apparatus the user slides shaft 16 toward the distal end of guide tube 20 thereby causing rods 12 to retract and the weed 58 to fall off. In the event that large vegetation is removed and in the removal process the vegetation wraps around sleeve 30, the user can easily slide the weed off of the apparatus due to the taper extending toward its proximal end.

Referring now to FIG. 7 and FIG. 8, in accordance with an alternative embodiment of the invention, the extraction head portion of the apparatus generally comprises an assembly 60 of tapered prongs 62 joined to coupling 14. So as to make the extraction head removable or interchangeable with other extraction heads, a set screw 64 threadably engages an opening 66 which extends through coupling 14 and into opening 18 to engage shaft 16. Alternatively, shaft 16 could be welded, glued, integrally joined to, frictionally coupled to, or otherwise attached to coupling 14. One or more slots 68 are provided so that prong assembly 60 can be extended through cap 26.

Figure 9:
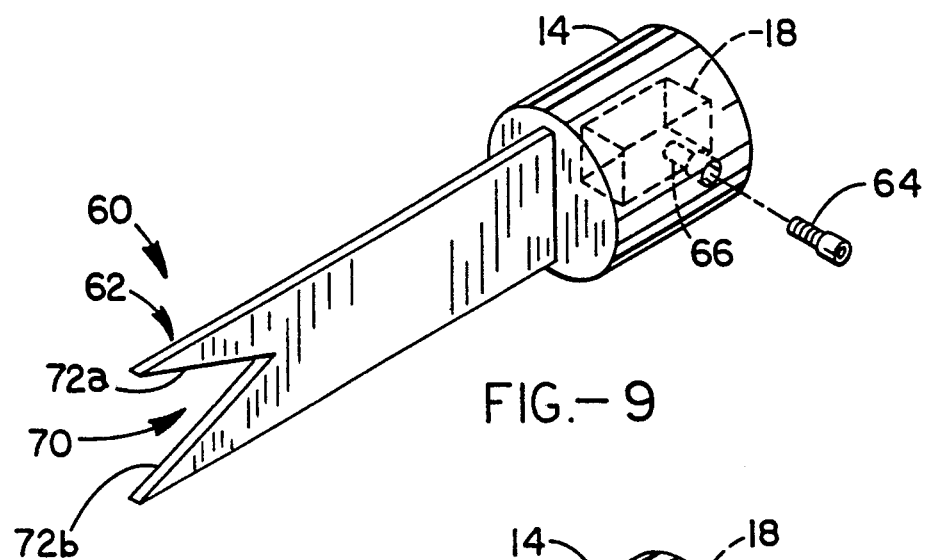
FIG. 9 is a perspective view of a two-prong extraction head in accordance with the present invention.
Figure 10:
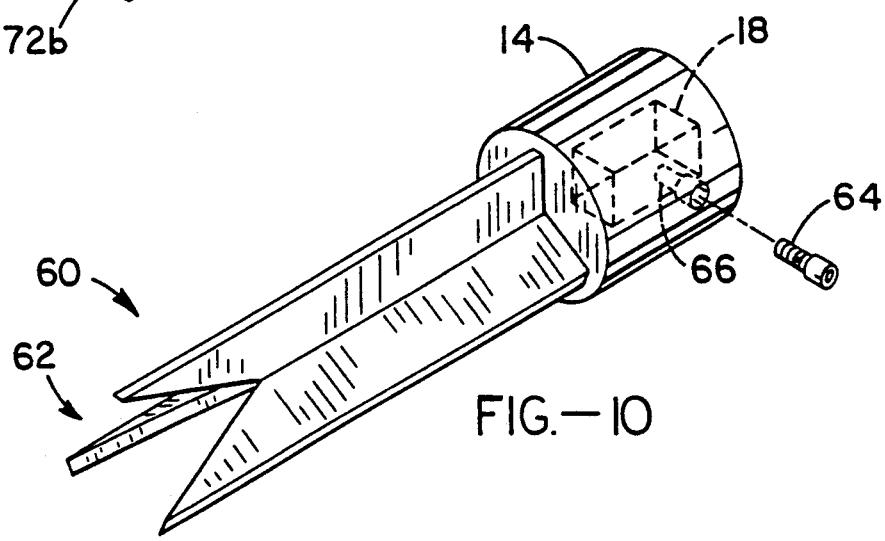
FIG. 10 is a perspective view of a four-prong extraction head in accordance with the present invention.
Figure 11:
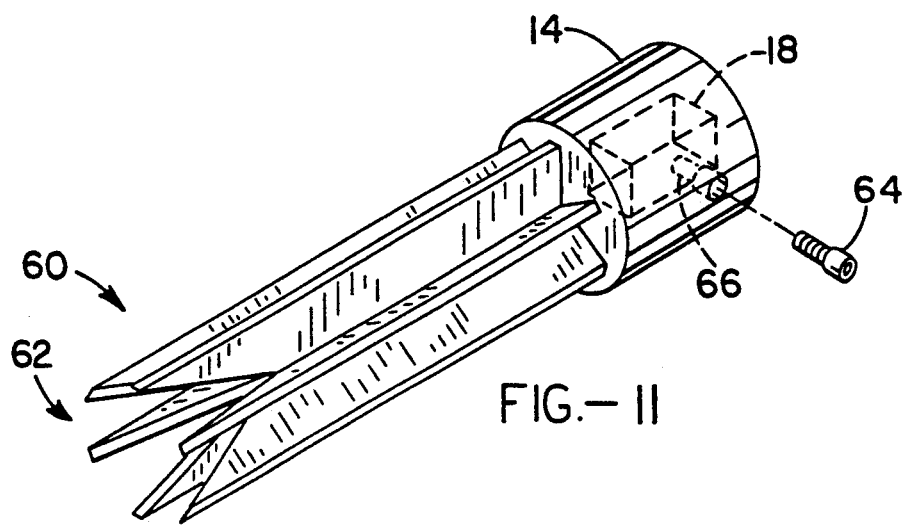
FIG. 11 is a perspective view of a six-prong extraction head in accordance with the present invention.

Referring now to FIG. 9, FIG. 10 and FIG. 11, prongs 62 are separated by a V-shaped cutout or notch 70 having opposing sides 72a, 72b which are anticlinal in relation to the proximal end of prong assembly 60. Sides 72a, 72b should be blunt so that notch 70 only engages the root and does not cut it. Note also, that this configuration of notch 70 is particularly advantageous in that notch 70 can receive roots of various diameters so as to provide positive engagement with the root during removal of the root and weed to which the root is joined. Use of two prongs, four prongs, or six prongs as shown in FIG. 9, FIG. 10 and FIG. 11, respectively, depends upon the type of vegetation being removed. For example, a two-prong assembly would be sufficient for extracting small weeds in lawn areas, whereas a four- or six-prong assembly would be more satisfactory for extracting blackberry vines or star-thistle. Those skilled in the art will appreciate that the number of prongs can be further varied and other configurations employed without departing from the invention disclosed herein.

Preferably prongs 62 are formed from a rigid material such as hardened steel or the like. Not only will use of such material provide for penetrating soil without damage to the extraction head, but permit the apparatus to be used for picking up aluminum cans or other debris on the ground surface. Also, while other configurations could be employed, prongs 62 are preferably generally planar. Since prongs 62 taper to a point, the taper in combination with a generally planar configuration permits prong assembly 60 to penetrate the soil with "knife-like" ease.

Accordingly, it will be seen that this invention provides for the efficient and complete removal of a weed or other vegetation and its root system, and eliminates entanglement which occurs in other extraction devices. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An apparatus for removing vegetation from soil, comprising:
    (a) a guide tube, said guide tube having a proximal end and a distal end;
    (b) a shaft, said shaft having a proximal end and a distal end, said shaft slidably disposed within said guide tube;
    (c) stop means for limiting the extent of travel of said shaft within said guide tube;
    (d) a weed extraction head coupled to coupled to said proximal end of said shaft;
    (e) coupling means for coupling said distal end of said shaft to a source of rotary force; and
    (f) a hollow sleeve, said sleeve having a proximal end and a distal end, said sleeve being tapered from said distal end toward said proximal end, said guide tube disposed within said sleeve, said proximal end of said guide tube being aligned with said proximal end of said sleeve, said sleeve coupled to said guide tube.

2. An apparatus as recited in claim 1, wherein said weed extraction head includes a plurality of rods, each of said rods having a tapered end.

3. An apparatus as recited in claim 1, wherein said weed extraction head includes a plurality of prongs separated by a V-shaped notch.

4. An apparatus as recited in claim 1, wherein said stop means comprises:
    (a) a first cap, said first cap coupled to said proximal end of said sleeve;
    (b) a second cap, said second cap coupled to said distal end of said guide tube; and
    (c) a plurality of collars, each of said collars including an opening through which said shaft extends, each of said collars coupled to said shaft, at least one of said collars positioned on said shaft within said guide tube, at least one of said collars positioned on said shaft in proximity to said coupling means.

5. An apparatus as recited in claim 4, further comprising a plurality of bushings, each said bushing including an opening through which said shaft extends, said bushings disposed between said shaft and said guide tube.

6. A weed extraction device, comprising:
    (a) an elongated shaft having a proximal end and a distal end, said distal end including a receptacle configured and structured for coupling to a source of rotary motion;
    (b) a weed extraction head coupled to said proximal end of said shaft;
    (c) a guide tube, said guide tube having a proximal end and a distal end, said shaft coaxially and slidably disposed within said guide tube, said proximal end of said shaft oriented with said proximal end of said guide tube; and
    (d) a sleeve, said sleeve having a proximal end and a distal end, said guide tube coaxially disposed within said sleeve, said guide tube coupled to said sleeve, said proximal end of said guide tube aligned with said proximal end of said sleeve.

7. An apparatus as recited in claim 6, wherein said weed extraction head includes a plurality of rods, each of said rods having a tapered end.

8. An apparatus as recited in claim 6, wherein said weed extraction head includes a plurality of prongs separated by a notch, said notch having anticlinal sides.

9. An apparatus as recited in claim 6, further comprising a coupling, said coupling disposed between said shaft and said weed extraction head.

10. An apparatus as recited in claim 9, further comprising a first cap, said cap including a plurality of openings through which a portion of said weed extraction head, said cap coupled to said proximal end of said sleeve.

11. An apparatus as recited in claim 10, further comprising a second cap, said second cap including an opening through which said shaft extends, said second cap coupled to said guide tube.

12. An apparatus as recited in claim 11, further comprising a plurality of collars, each of said collars including an opening through which said shaft extends, at least one of said collars positioned for engagement with said second cap when said shaft is moved toward said proximal end of said guide tube, at least one of said collars positioned for engagement with said second cap when said shaft is moved toward said distal end of said guide tube.

13. An apparatus as recited in claim 12, further comprising a plug, said plug including an opening through which said guide tube extends, said plug disposed between said guide tube and said sleeve at said distal end of said sleeve.

14. A rotary weed extractor, comprising:

(a) an elongated central shaft, said shaft having a first end and a second end, said first end of said shaft configured and structured for coupling to a source of rotary motion;

(b) a weed extraction head, said weed extraction head including a coupling, said coupling having a first end and a second end, said first end of said coupling being coupled to said second end of said shaft;

(c) a guide tube, said guide tube having a first end and a second end, said shaft coaxially disposed within said guide tube, said shaft slidably engaging said guide tube, said first end of said shaft oriented with said first end of said guide tube;

(d) a first cap, said first cap including a plurality of openings through which a portion of said weed extraction head extends, said first cap covering said second end of said guide tube;

(e) a second cap, said second cap including a coaxially disposed opening, said shaft extending through said opening, said second cap covering said first end of said guide tube; and (f) a plurality of collars, each of said collars including an opening through which said shaft extends, at least one of said collars positioned for engagement with said second cap when said shaft is moved toward said first end of said guide tube, at least one of said collars positioned for engagement with said second cap when said shaft is moved toward said second end of said guide tube.

15. An apparatus as recited in claim 14, further comprising a sleeve, said sleeve having a first end and a second end, said guide tube coaxially disposed within said sleeve, said guide tube fixedly coupled to said sleeve, said second end of said guide tube aligned with said second end of said sleeve, said first cap covering said second end of said sleeve.

16. An apparatus as recited in claim 14, wherein said weed extraction head includes a plurality of rods, each of said rods having a tapered end.

17. An apparatus as recited in claim 14, wherein said weed extraction head includes a plurality of prongs separated by V-shaped notch.

* * * * *